United States Patent [19]

Shuetz et al.

[11] Patent Number: 5,290,613
[45] Date of Patent: Mar. 1, 1994

[54] DEODORIZED MULTILAYER FILM WITH VINYLIDENE CHLORIDE COPOLYMER BARRIER

[75] Inventors: Jeffrey M. Shuetz, Woodridge; Stephen J. Vicik, Darien, both of Ill.

[73] Assignee: Viskase Corporation, Chicago, Ill.

[21] Appl. No.: 919,399

[22] Filed: Jul. 29, 1992

Related U.S. Application Data

[63] Continuation of Ser. No. 547,703, Jul. 3, 1990, abandoned.

[51] Int. Cl.$^5$ .............................................. B65D 30/08
[52] U.S. Cl. .................................... 428/35.4; 428/349; 428/910; 428/518; 428/35.2; 428/36.7; 383/109; 383/908
[58] Field of Search ...................... 428/34.9, 518, 480, 428/483, 35.4, 910, 36.7, 35.2; 383/109, 908

[56] References Cited

U.S. PATENT DOCUMENTS

| | | | |
|---|---|---|---|
| 3,456,044 | 4/1969 | Pahlke | 264/25 |
| 3,539,306 | 11/1970 | Kumura et al. | 23/215 |
| 3,741,253 | 6/1973 | Brax et al. | 138/137 |
| 4,737,391 | 4/1988 | Lustig et al. | 428/34.9 |
| 4,798,751 | 1/1989 | Schuetz | 428/349 |
| 4,963,608 | 10/1990 | Kunieda et al. | 524/394 |

FOREIGN PATENT DOCUMENTS 1352890 5/1974 United Kingdom.
2185986 8/1987 United Kingdom.

OTHER PUBLICATIONS

"DHT-4A Hydrotalcite-like Compound", Kyowa Chemical Industry Co., Ltd, Jul. 15, 1981, (4 pages).
"Vinylidene Chloride and Poly (Vinylidene Chloride)", Kirk-Othmer, Encyclopedia of Chemical Technology, 1983 (pp. 780-783).
"Effects of Film Variety on the Amounts of Carboxylic Acids from Electron Beam Irradiated Polyethylene Film", Azuma et al, Agric Biol Chem., 48 (8) pp. 2003-2008, 1984.

*Primary Examiner*—Ellis P. Robinson
*Assistant Examiner*—Charles R. Nold
*Attorney, Agent, or Firm*—John C. LeFever

[57] ABSTRACT

In a multilayer thermoplastic film having a vinylidene chloride copolymer barrier and at least a polyolefin second layer laminated to the barrier layer wherein at least the barrier layer is irradiated, hydrotalcite is blended with the polyolefin and substantially reduces odor generation due to ionizing irradiation of the barrier layer.

18 Claims, No Drawings

DEODORIZED MULTILAYER FILM WITH VINYLIDENE CHLORIDE COPOLYMER BARRIER

This application is a continuation of prior U.S. application Ser. No. 07/547,703, filed Jul. 3, 1990, now abandoned.

FIELD OF THE INVENTION

This invention relates to a deodorized multilayer thermoplastic film having a vinylidene chloride copolymer barrier layer and at least a polyolefin second layer laminated to the barrier wherein at least the barrier layer is irradiated. The film may be biaxially oriented and heat shrinkable, thus suitable for shrink packaging fresh red meats and processed meats.

BACKGROUND OF THE INVENTION

In the packaging of food products with thermoplastic films, a widely used oxygen and moisture barrier is vinylidene chloride copolymers as for example manufactured with vinyl chloride or methyl acrylate comonomer. For example, a commonly used film is a multilayer heat shrinkable type including a vinylidene chloride-vinyl chloride copolymer barrier layer with a polyolefin such as ethylene vinyl acetate (EVA) laminated to one side of the barrier layer to form a heat sealable layer. An abuse-resistant layer is also frequently employed and laminated to the opposite side of the barrier. This layer may also be formed of a polyolefin as for example EVA. The resulting three layer film is biaxially stretched if heat shrinking capability is desired, and fabricated into a bag with the heat sealable layer on the inside for direct contact with the food product and the abuse-resistant layer on the outside.

After inserting the food product such as fresh red meat or processed meat in the bag, the latter may be evacuated to pull the film inside surface against the meat product outer surface, but in any event the bag open end is sealed, most commonly by the application of heat, i.e., a heat seal. In some instances the food product is also cooked in the sealed bag by immersion in a hot water bath, i.e. a "cook-in" system.

It is also common to irradiate the film before fabrication into a bag, and if multilayered this effects crosslinking of the various layers to different degrees, depending on the layer composition and proximity to the irradiation source. There are two main reasons for irradiation: to strengthen the thermoplastic film's physical properties such as impact strength and tensile strength, and also to raise the thermoplastic film's softening point. This in turn widens the heat sealing range thereby permitting operation of the heat sealing device at higher temperatures.

It is known that as a result of irradiation, odors develop in thermoplastic bags at least in part formed from vinylidene chloride copolymers. It has also been determined that in a three layer irradiated film of the polyolefin/vinylidene chloride copolymer/polyolefin type, the odors come primarily from the vinylidene chloride copolymer. Although this is not a problem in most food packages because the odors are relatively mild and do not permeate the food itself, there are sporadic complaints about odors from the food processors.

The odors are believed derived from compounds directly or indirectly formed from partial decomposition of the vinylidene chloride copolymer as a result of irradiation. For example, this material is thermally unstable and when heated by irradiation evolves hydrochloric acid or chloride in the salt form. This leaves a carbonaceous residue. The reaction is quite complicated and affected by physical changes in the solid, the method of preparing the vinylidene chloride copolymer and its purity. The polymer discolors gradually from white to yellow, and under extreme conditions it turns brown and eventually black.

Analysis of the odorous components in multilayer films of the vinylidene chloride copolymer core-barrier layer type indicates the presence of inorganic and organic acids, alcohols, ketones, esters and aldehydes of various types and amounts. Most of the identified chemical species have been determined to evolve from the vinylidene chloride copolymer barrier layer.

The prior art literature contains many theories on the source of these compounds, but it is generally recognized that the aforementioned HCL (as a decomposition by product of vinylidene chloride copolymer decomposition) is the most important reactant in the decomposition mechanism. If the multilayer film contains ethylene vinyl acetate as at least one of the other layers, acetic acid results from this irradiation. A myriad of chemical compounds are believed formed from the free radical combination and breakdown of the additives in the film as for example processing aids. Hydrochloric acid reacts with at least some of the chemical specie to produce at least some of the odor producing compounds.

The stability of vinylidene chloride copolymers also depends on the comonomer. Copolymers with vinyl chloride and the acrylates degrade slowly. Acrylonitrile copolymers degrade more rapidly and release HCN as well as HCL.

The art of stabilizing vinylidene chloride copolymers is highly developed. It was believed that the ideal stabilizer system should achieve absorb or combine with evolved HCL irreversibly under conditions of use, but not strip HCL from the polymer chain, and possibly possess antioxidant activity so as to prevent the formation of carbonyl groups and other chloride-activating structures.

A wide variety of commercially available compounds known for effectiveness as deodorants in polyvinylidene chloride copolymer systems have been tested but none have been satisfactory. In particular, acid acceptor style compounds were tried with disappointing results. These compounds included epoxidized soy bean oil, sodium citrate and tetra sodium pyrophosphate.

Another well-known hydrochloric acid absorbent is hydrotalcite. It is known as a mineral having a chemical structure of the formula $Mg_{4.5} Al_2 (OH)_{13} CO_3 \cdot 3.5H_2O$ which has been naturally produced in only very few limited areas such as Suarum, Norway and the Ural mountains. Hydrotalcite is also synthesized, manufactured and sold by Kyowa Chemical Industry Co., Ltd of Tokyo, Japan. As used herein, "hydrotalcite" means the above described compound irrespective of its source, i.e., naturally occurring or synthetically prepared. A process for manufacturing hydrotalcite is for example described in Kumura et al U.S. Pat. No. 3,539,306, incorporated herein to the extent pertinent. In general, this process involves mixing (A) an aluminum component selected from aluminum hydroxide, aluminum amino acid salts, aluminum alcoholate, water-soluble aluminates, aluminum nitrate and aluminum sulphate, with (B) a selected magnesium component and (C) an alkali carbonate. The magnesium component is selected from magnesium oxide, magnesium hydroxide and water-soluble magnesium salts. The mixing is performed in an aqueous medium at temperatures of from 0° to 150° C. at a pH of at least 8. The mixture has a molar ratio in terms of $Al_2O_3$: MgO of substantially 1:6. The hydrotalcite is obtained in the form of precipitate, washed with water if desired, and thereafter the solid is separated by known solid-liquid separation means such as centrifuge, followed by drying to serve as the dry product.

According to Kumura et al, the critical feature of the hydrotalcite manufacturing process is that the reaction of the aluminum component, magnesium component and carbon dioxide is performed in water and under basic conditions. It is thereby possible to provide carbon dioxide in the form of carbonate ion, and consequently mild reaction conditions with respect to temperature and pressure are said to be feasible.

Applicants have followed the prior art teachings and prepared heat shrinkable biaxially oriented three layer thermoplastic films with a small concentration such as 0.1 wt. % hydrotalcite in the vinylidene chloride copolymer barrier layer of a biaxially oriented heat shrinkable multilayer with EVA inner and outer layers. This was partially successful in reducing the film odor after irradiation at 3-4 MR. However, there was still a noticeable odor in the irradiated film. In an attempt for further improvement, the hydrotalcite loading was further increased to 0.3 ppm in the vinylidene chloride copolymer barrier layer. There was further reduction in the odor but unfortunately the hydrotalcite loading was so high as to cause agglomeration of particles and numerous bubble breaks causing process interruptions during biaxial orientation of the film by the double bubble procedure. It was apparent from these experiments that the irradiated film odor could not be substantially eliminated by hydrotalcite addition to the vinylidene chloride copolymer barrier layer.

Part of this problem is believed due to the fact that the total chemistry of the odor-producing compounds in the vinylidene chloride copolymer barrier layer of an irradiated multilayer film is extremely complex. Between fifty and sixty compounds have been identified as constituents in the odor-generating gas evolved from the irradiated film.

An object of the invention is to provide an improved irradiated multilayer thermoplastic film having a vinylidene chloride copolymer type barrier-core layer, which is characterized by substantially lower odor than heretofore achieved with comparable prior art films.

Another object is to provide an improved method for manufacturing a heat shrinkable biaxially oriented irradiated multilayer film having a vinylidene chloride copolymer barrier layer, which film is characterized by substantially lower odor than corresponding films prepared by prior art techniques.

Still another object is to provide a biaxially oriented and heat-shrinkable thermoplastic bag formed of irradiated multilayer film having very mild (if any) odor, and comprising a vinylidene chloride copolymer barrier layer and polyolefin inner and outer layers, the three layers being cross-linked by ionizing irradiation of the entire film.

A further object is to provide a food product package comprising a food body entirely enclosed within a thermoplastic bag formed by irradiated multilayer film as described in the immediately preceding paragraph, the film being heat shrunk around the food body with the inner layer inside surface in contiguous relation therewith, yet with very mild (if any) odor from the bag.

Other objects and advantages of the invention will be apparent from the ensuing disclosure and appended claims. As will be explained hereinafter, this invention achieves all of the aforedescribed objects in an unexpected and inexpensive manner.

SUMMARY OF THE INVENTION

We have unexpectedly discovered that the aforedescribed objectives are realized in a multilayer thermoplastic film having a vinylidene chloride copolymer barrier layer and at least a polyolefin second layer laminated to the barrier wherein at least the barrier layer is irradiated. The improvement comprises blending hydrotalcite with the polyolefin in quantity to comprise at least about 0.1 wt. % of the total blend. Comparative tests have demonstrated that the hydrotalcite is far more effective as an odor suppressant in the polyolefin second layer than in the vinylidene chloride copolymer layer of an irradiated film. This is quite surprising, because the odors are generally understood as primarily resulting from compounds formed during irradiation of the vinylidene chloride copolymer. So one would expect that an odor suppressant would be most effective if placed contiguously to the odor source.

It is also surprising that odor suppression is achieved by means of the hydrotalcite in the inner layer even though yellowing of the irradiated polyvinylchloride copolymer barrier layer is not retarded. That is, yellowing results from cleavage of the HCL molecules and this is unaffected by the invention. The hydrochloric acid is believed to initiate many of the reactions producing odoriferous compounds, yet odors are drastically suppressed by the invention.

It is speculated that this surprising reduction in odors is at least in part due to diffusion of odoriferous compounds from the relatively high density vinylidene chloride copolymer barrier layer where the concentration of these compounds is relatively high, to the less dense polyolefin layer where the concentration of the odoriferous compounds is relatively low. For example, the density of the vinylidene chloride copolymer barrier layer is about 1.7 whereas the density of the polyolefin layer is on the order of 0.9. Another possible factor is that the vinylidene chloride copolymer layer crystallizes and forms an ordered structure which restricts mobility of the odoriferous gas molecules, whereas the polyolefin is amorphous and permits greater mobility of these molecules.

In a preferred embodiment, the aforedescribed barrier layer is the core layer of a three layer film with ethylene vinyl acetate-type polyolefin forming at least a component of the inner second layer and the outer third layer. In an even more preferred embodiment this three layer film is biaxially stretched and thereby made heat shrinkable. It may then be used for shrink packaging various products as for example food.

Another aspect of the invention relates to a biaxially stretched and heat-shrinkable thermoplastic bag formed of multilayer film. The latter comprises a vinylidene chloride copolymer barrier layer, an ethylene vinyl acetate inner layer laminated to one side of the core layer and containing at least about 0.1 wt. % hydrotalcite, and an outer layer laminated to the opposite side of the core layer. The entire film is irradiated. The bags may for example be produced from the three-layer film of this invention by heat sealing. For instance, if the film of this invention is produced in the form of tubular film, bags can be produced therefrom by heat sealing one end of a length of the tubular film or by sealing both ends of the tube, then slitting one edge to form the bag mouth. If the film of this invention is made in the form of flat sheets, bags can be formed therefrom by heat sealing three edges of two superimposed sheets of film. When carrying out the heat sealing operation, the surfaces which are heat sealed to each other to form seams are the aforedescribed inner layers of the films of the invention. Thus, for example, when forming a bag by heat sealing one edge of a length of tubular film, the inner surface of the tube, i.e., the surface which will be heat sealed to itself, will be the inner layer of the film.

Still another aspect of the invention relates to a food product package entirely enclosed within the aforedescribed bag, the film being heat shrunk around the food body with the inner layer inside surface in contiguous relation therewith.

This invention also relates to a method for manufacturing a heat-shrinkable multilayer thermoplastic film comprising the steps of: (a) providing a vinylidene chloride copolymer resin, a blend of ethylene vinyl acetate (EVA) resin and at least about 0.1 wt. % hydrotalcite, and a polyolefin resin; (b) coextruding the vinylidene chloride copolymer as a core layer, the EVA- hydrotalcite blend as a second layer on one side of the core layer, and the polyolefin as a third layer on the opposite side of the core layer, so as to form a three layer film. The latter is heated, then biaxially oriented, and finally the entire film is irradiated.

DETAILED DESCRIPTION

The hydrotalcite loading in the polyolefin second layer is preferably less than about 0.5% of the layer total weight (herein abbreviated at "wt. %"). Higher loadings do not provide further improved odor reduction and may cause difficulties in film manufacture. The preferred hydrotalcite loading is about 0.2 wt. %.

Although the invention is specifically described in the form of a three layer film, in its broadest context only two layers are required: the vinylidene chloride copolymer barrier layer and one polyolefin layer. More than three layers are also contemplated, for example, a five layer film comprising outer layers of polypropylene or ethylene-propylene copolymer, the aforedescribed vinylidene chloride copolymer as a barrier layer and an adhesive layer between each outer layer and the barrier layer.

The multilayer film of this invention can be produced by known techniques such as by coextruding the multiple layers through an annular die into a tube. If a heat shrinkable film is desired, this tube may be biaxially stretched in accordance with the conventional "double bubble" technique disclosed in Pahlke U.S. Pat. No. 3,456,044. Alternatively, the films may be fabricated by extrusion coating, wherein a base tube is extruded and succeeding layers are surface coated on the base tube in a manner such as that disclosed in the aforementioned U.S. Pat. No. 3,741,253 to Brax et al. Also, the multilayer film may be slot cast and biaxially stretched by tentering before the resulting sheet is fabricated into bags. Still further, the inventive multilayer film may be fabricated by producing separate layers and then laminating the layers together. The present invention contemplates blown films as well as uniaxially or biaxially oriented films of at least two layers.

The preferred heat shrinkable multilayer film of this invention will generally have a total thickness of from about 1.75 mils to about 4.0 mils, and preferably of from about 2.0 mils to about 4.0 mils, because when the thickness of the multilayer film is more than 4.0 mils, clipping problems are encountered in that it is difficult to gather together the open end of a bag made therefrom. When the thickness of the multilayer film is less than 1.75 mils, the bag will have diminished puncture resistance.

If the preferred three layer film is heat shrinkable for food packaging, the first outer layer will preferably have a thickness of from about 1.1 mils to about 2.0 mils; the core layer will preferably have a thickness of from about 0.20 mil to about 0.45 mil; and the second outer layer will preferably have a thickness of from about 0.4 mil to about 1.5 mils. The thickness of the first outer layer, which is the inner layer of the bag, is preferably within the aforementioned range because the sealing and processability properties of the film layer would otherwise be diminished. The thickness of the core layer is preferably within the above-indicated range because the film would provide inadequate barrier properties if the core layer thickness is less than about 0.20 mil. The preferred upper limit of 0.45 mil for the core layer is based on the barrier effectiveness needed for intended uses of the multilayer film. The thickness of the second outer layer, which is the outer layer of the bag, is preferably in the aforementioned range to provide desired toughness and puncture resistance and also keep the total thickness of the film in the range from about 1.75 mils to about 4.0 mils.

The entire multilayer film of this invention is preferably irradiated. If the film is biaxially oriented for heat shrinkability, the irradiation step preferably follows the biaxial orientation step. As explained in Lustig et al. U.S. Pat. No. 4,737,391, this post-irradiation sequence is preferred because the film to be irradiated is much thinner than the nonoriented film, so the same degree of cross-linking can be achieved at lower voltage than with the unstretched film. Using post-irradiation the multilayer film of this invention is preferably irradiated to a dosage level of between about 1 megarad and about 5 megarads, and most preferably between about 2 megarads and about 4 megarads, by any suitable method such as by employing an electron beam. When the energy level is below the indicated range, sufficient cross-linking is not obtained to improve the heat sealing characteristics and toughness properties of the multilayer film. When the energy level is above the aforementioned range, the degree of the film shrinkage is significantly reduced and further improvements in the heat sealing characteristics and toughness properties of the film are not achieved.

When the vinylidene chloride copolymer is or includes the vinyl chloride copolymer and biaxial stretching is desired, the latter's molecular weight preferably is at least about 75,000 to readily achieve biaxial orientation and film toughness, and up to about 135,000 for ease of extrudability. The most preferred range is between about 120,000 and about 130,000 molecular weight. Also, the vinyl chloride content in the copolymer is preferably between about 5 weight percent for ease of extrudability and up to about 35 weight percent for maximum barrier properties, the most preferred range being between 15 and 30 weight percent vinyl chloride.

When the vinylidene chloride copolymer is or includes the methyl acrylate copolymer, the latter's molecular weight is preferably at least about 75,000 to readily achieve the desired biaxial orientation and film toughness, and up to about 130,000 for ease of extrudability. The most preferred range is between about 90,000 and about 110,000 molecular weight. Also, the methyl acrylate content in the copolymer is preferably between about 5 weight percent for ease of extrudability and up to about 15 weight percent which is the U.S. Federal Food and Drug Administration's limit. The most preferred range for methyl acrylate content is between about 6 and about 10 weight percent in the copolymer with vinylidene chloride.

The vinylidene chloride copolymer layer of the inventive film may also comprise a blend of two copolymers. As for example described in Schuetz U.S. Pat. No. 4,798,751, a suitable blend may be vinylidene chloride-methyl acrylate copolymer and vinylidene chloride-vinyl chloride copolymer, with between about 2.9 and about 13.5 weight percent methyl acrylate and between about 2.9 and about 11.6 weight percent vinyl chloride. This blend provides a balance between no significant discoloration on irradiation or exposure to elevated temperature for sustained periods, and avoidance of processing difficulties during manufacturing.

The vinylidene chloride copolymer core layer preferably contains less than 5 weight percent plasticizer, the percentage being based on the total weight of the blend of copolymers and all additives including plasticizer, in order to maximize the barrier properties of the thin film. Conventional plasticizers such as dibutyl sebacate and epoxidized soybean oil can be used.

The polyolefin layer of this invention may be prepared from copolymers of two or more olefins such as polyethylene and higher alpha olefins for example the $C_3$ to $C_{10}$ types or copolymers of olefins and another hydrocarbon as for example ethylene vinyl acetate (EVA), or blends thereof. The former include polypropylene, low density polyethylene (LDPE), linear low density polyethylene (LLDPE), and very low density polyethylene (VLDPE) sometimes referred to as ultra low density polyethylene (ULDPE).

Preferred polyolefins are LLDPE, VLDPE, EVA and blends thereof. Linear low density polyethylene (LLDPE) refers to copolymers of ethylene with one or more comonomers selected from preferably $C_4$ to $C_{10}$ alpha-olefins such as butene-1, octene, in which long chains of copolymer are formed with relatively few side chain branches or cross-linking. The degree of branching is less than that found in typical conventional low or medium density polyethylene. LLDPE may also be characterized by the known low pressure, low temperature processes used for their production. LLDPE is known to have a density between about 0.91 and 0.93 grams per cubic centimeter and a melting point of approximately 120° C. VLDPE is a copolymer of ethylene and at least one comonomer selected from $C_4$ to $C_{10}$ alpha-olefins and having a density between about 0.86 and 0.91 g/cc and a melting point of about 120° C. EVA is a copolymer of ethylene and vinyl acetate. Preferred EVA resins will comprise between about 1 to 20 percent vinyl acetate by weight and most preferably 3 to 12 percent by weight. Advantageously, EVA may be blended with LLDPE or VLDPE.

Also, adhesives may be blended in the layers or adhesive layers may be laminated, coated or coextruded. Suitable adhesive resins include anhydride based EVA and LLDPE resins.

In general, various conventional additives such as slip agents, anti-blocking agents and pigments can be incorporated in the multilayer film of this invention, as is well known in the art.

The resins and any additives are introduced to an extruder (generally one extruder per layer) where the resins are melt plastified by heating and then transferred to the coextrusion die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. In coextrusion, barrel and die temperatures, for example, may range between about 175° C. and 250° C. However, depending upon the manufacturing process used and particular equipment and other process parameters utilized, variations and actual process parameters including process temperatures will be set by one skilled in the art without undue experimentation.

In a preferred coextrusion type of double bubble process as described in U.S. Pat. No. 3,456,044 the primary tube leaving the die is inflated by admission of air, cooled, collapsed, and then preferably oriented by reinflating to form a secondary bubble with reheating to the film's orientation (draw) temperature range. Machine direction (M.D.) orientation is produced by pulling e.g. by utilizing a pair of rolls traveling at different speeds and transverse direction (T.D.) orientation is obtained by radial bubble expansion. The oriented film is set by cooling. Suitable machine direction and transverse direction stretch ratios are from about 1.5:1 to about 3.5:1 with a ratio of about 2.5:1 preferred.

The invention will be more fully understood by the ensuing examples.

EXAMPLE 1

In this example, flexible tubes of about 10¾ inches flat width three layer films comprising Samples 1–4 were prepared by coextrusion using laboratory-scale equipment into structures having substantially identical inner, barrier-core and outer layers except for small additives of deodorants in certain layers as discussed below.

The films of this Example 1 were nonsymmetrical by virtue of having different compositions in the inner (sealing) layer and outer (abuse) layer. The inner layer (about 1.4 mil thick) was 100% EVA with a vinyl acetate content of 10 wt. % and melt index of 0.25 (prepared from Union Carbide Corporation resin product 6833). The core-barrier layer (about 0.2 mil thick) was formed of a blend comprising vinylidene chloride-vinyl chloride copolymer and vinylidene chloride-methyl acrylate copolymer (both manufactured by Solvay Chemical Company, Belgium). The methyl acrylate comprised 6.8 wt. % and the vinyl chloride comprised 2.3 wt. % of the blend. The outer layer (about 0.6 mil thick) was formed from a blend of 75% EVA having a 12 wt. % vinyl acetate content (DuPont resin product Elvax 3135X) and 25% EVA having a 4.5 wt. % vinyl acetate content (United States Industries resin product NA 357). Sample 1 additionally had in only the barrier layer, 0.1 wt. % synthetic hydrotalcite sold by Kyowa Chemical Company, Tokyo, Japan, under the product designation DHT-4A. Sample 2 contained 0.1 wt. % of the same synthetic hydrotalcite in both the inner layer and the barrier layer. Sample 3 contained 0.1 wt. % sodium citrate, a well-known buffer, interspersed in only the barrier layer. This was added to possibly remove odor by reacting with the HCL and converting same to NaCl. Sample 4 was the control without hydrotalcite in any of the layers.

After biaxial orientation using the double or trapped bubble technique, the Samples 1–4 films were irradiated to a dosage of about 3 MR.

The pH of the inside surface of each film sample was measured with an electrode-type probe moistured with water. Also, the film samples were conditioned by placing a 12 inch$^2$ sample in a glass jar for 3 days at 120° F. and then given an odor rating at ambient temperature by a panel of three persons. The odor ratings were qualitative in nature and based on the following guidelines: 1-very mild, 3-noticeable odor, 5-strong odor. The reported odor ratings are an arithmetic average of the ratings assigned by the individual panelists.

The results of the Example 1 tests are summarized in Table A:

TABLE A

| | Solvay PVDC Multilayer Film | | |
|---|---|---|---|
| Sample No. | Type Film | pH (Inside) | Odor Rating Average |
| 1 | 0.1% hydrotalcite in barrier layer | 4.2 | 3.3 |
| 2 | 0.1% hydrotalcite in inner and barrier layers | 4.3 | 1.6 |
| 3 | 0.1% sodium citrate in barrier layer | 4.1 | 3.0 |
| 4 | control-no hydrotalcite | 4.0 | 2.3–4.5* |

*results of several tests

Table A shows that hydrotalcite in the barrier layer provides little if any odor reduction, nor does sodium citrate but surprisingly there was a substantial improvement when the same concentration of hydrotalcite was also added to the inner layer. Since the pH (measured on the inside surface of the inner layer) was about the same for all samples, the improvement in odor reduction was apparently not due to HCL removal.

EXAMPLE 2

In this example, flexible tubes of about 10¼ inches flat width three layer films comprising Samples 6–8 were prepared on the same laboratory-scale equipment and by the same method described in Example 1. The individual layer and film thicknesses were about the same as described in Example 1. The inner and outer layers were formed from the same EVA resins used in Example 1, the only difference being the source of the vinylidene chloride copolymers used in the barrier layer. Whereas the Example 1 constituents were purchased from Solvay, the vinylidene chloride-vinyl chloride copolymer used in Examples 6–8 was purchased from Kureha Kagaku Kogyo Kabushika Ltd., Tokyo, Japan, and the vinylidene chloride-methyl acrylate copolymer was purchased from Dow Chemical Company. As in Example 1, the blend comprised 6 wt. % methyl acrylate and 7.2 wt. % vinyl chloride.

Sample 6 contained 0.05 wt. % hydrotalcite in the inner layer only whereas Sample 7 contained 0.1 wt. % hydrotalcite in the inner layer only. The control Sample 8 did not contain hydrotalcite in any of the layers.

After conditioning for three days at 120° F. the film samples were assigned an odor rating using the aforedescribed designations, but with a six person panel. The results of these experiments are summarized in Table B.

TABLE B

| | Dow PVDC Multilayer Film | | |
|---|---|---|---|
| Sample No. | Type Film | pH (Inside) | Odor Rating Average |
| 6 | 0.05% hydrotalcite in inner layer | 4.1 | 1.08 |
| 7 | 0.1% hydrotalcite in inner layer | 4.0 | 1.08 |
| 8 | control-no hydrotalcite | 4.1 | 1.58 |

From a comparison of Tables A and B, it will be seen that even though the barrier layer principal components are the same, the odor rating for the Dow PVDC is lower than the Solvay PVDC. This is probably because the manufacturers use different polymerization processes, and also because the additives to the PVDC resins are different.

EXAMPLE 3

In this example, flexible tubes of about 15 inches flat width three layer films comprising Samples 9–12 were prepared by coextrusion using production-scale equipment into structures having substantially identical inner and outer layers except for small additions of hydrotalcite in certain layers, as described below. The hydrotalcite was the same type used in Examples 1 and 2.

Unlike the Example 1 and 2 films, the inner and outer layers of the Example 3 films were identical. Each comprised 75 wt. % of the aforementioned Attane 4001 ultra low density polyethylene and 25 wt. % of the aforementioned Union Carbide EVA (10 wt. % vinyl acetate). The film thickness was about 2.2 mils. The inner (heat sealing) layer was about 1.4 mils thick and the outer (abuse resistant) layer was about 0.6 mils thick. The barrier layer (about 0.2 mils thick) was the same blend of vinylidene chloride-vinyl chloride-methyl acrylate copolymer (based on resins purchased from Solvay) used in Example 1.

Sample 9 contained no hydrotalcite so was the control. Sample 10 contained 0.1 wt. % hydrotalcite in only the barrier layer, whereas Sample 11 contained 0.3 wt. % hydrotalcite only in its barrier layer. This was found to be excessive because the additive agglomerated and caused many bubble breaks during biaxial orientation. Sample 12 contained 0.2 wt. % hydrotalcite in only the inner layer.

The Example 3 films were biaxially oriented by the double bubble method and thereafter irradiated at about 4 MR for cross-linking. The pH of the film inside surface was measured in the same manner as in Examples 1 and 2. Also, the film samples were assigned an odor rating using the described numerical designations with a three person panel. The results of these tests are summarized in Table C.

TABLE C

| | Production Scale Tests | | |
|---|---|---|---|
| Sample No. | Type Film | pH (Inside) | Odor Rating Average |
| 9 | control-no hydrotalcite | 3.8 | 3.5 |
| 10 | 0.1% hydrotalcite in barrier layer | 5.3 | 2.5 |
| 11 | 0.3% hydrotalcite in barrier layer | 5.4 | 1.5 |
| 12 | 0.2% hydrotalcite | 5.6 | 1.0 |

TABLE C-continued

| | Production Scale Tests | | |
|---|---|---|---|
| Sample No. | Type Film | pH (Inside) | Odor Rating Average |
| | in inner layer | | |

Sample 10 demonstrates improvement over control Sample 9 by virtue of 0.1% hydrotalcite in the barrier layer. In an effort to achieve further improvement in odor reduction, the hydrotalcite content was increased threefold in Sample 11. This Sample (0.3 wt. % hydrotalcite in only the barrier layer) also provided substantial odor reduction, but since the high additive loading caused particle agglomeration and many bubble breaks, this system would not be suitable for commercial production. Accordingly, it would not be possible to improve the performance of the Sample 10 type film (with hydrotalcite only in the core layer) by substantially increasing the loading of this additive in the barrier layer. Table C demonstrates that Sample 12 with 0.2 wt. % hydrotalcite in only the inner layer provided a dramatic improvement in odor reduction (odor rating 1.0), and in fact had very mild odor. Its pH value was about the same as Sample 10, indicating that the improvement was not primarily due to HCL removal.

In view of the outstanding performance of Sample 12, it was analyzed for volatile content along with control Sample 9 (no hydrotalcite). The procedure was to trap gases evolved from the barrier layer or film samples at 50° C. by liquefaction in a liquid nitrogen bath. They were then volatilized in a gas chromatograph, identified by comparison with peaks for known gases, and quantified by an integrator. The quantities were then compared on the basis of total area.

The results of these analysis are summarized in Table D.

TABLE D

| | | Volatile Content | |
|---|---|---|---|
| Sample No. | Film Type | Total Area (Measure Of Volatile Content) | Sample wt. (gms) |
| 9 | control-no hydrotalcite | Entire film 14.4 × $10^7$ Barrier only 50.6 × $10^7$ | 2.6 1.3 |
| 12 | 0.2% hydrotalcite in inner layer | Entire film 12.5 × $10^7$ Barrier only 7.6 × $10^7$ | 2.6 1.4 |

Table D shows that the film of this invention provided about sevenfold reduction in organic volatiles, excluding HCl, from the core layer. These volatiles are at least partially responsible for the perceived odor in the sample multilayer films, and the data quantifies removal of a portion of the volatiles by hydrotalcite in the film inner layer. Accordingly, Table D represents quantitative proof (in addition to the qualitative odor panel test) that a small concentration of hydrotalcite in the VLDPE-EVA blend inner layer effectively reduces odors resulting from organic compounds formed by irradiation of the vinylidene chloride copolymer core/barrier layer. This was particularly surprising because to the best of our knowledge, hydrotalcite is only known by those skilled in the art as an acid scavenger.

Certain of the physical and optical properties of Samples 9 and 12 were measured and found to be similar. Accordingly, the present invention does not adversely affect film properties.

EXAMPLE 4

In this example, flexible tubes of about 14 inches flat width three layer films comprising Samples 13-16 were prepared by coextrusion using production scale equipment into structures having substantially identical inner and outer layers except for small additions of hydrotalcite and/or sodium citrate. The inner and outer layer base composition was the same as Samples 9-12 (Example 3) and the barrier layer was the same as Examples 1 and 3. All films were biaxially oriented and then irradiated at 3.6 MR. The film thickness was about 2.2 mils and the inner layer being about 1.4 mils and the outer layer about 0.6 mils.

Sample 13 contained no hydrotalcite so was the control. Sample 14 contained 0.2 wt. % hydrotalcite in only the inner layer, Sample 15 contained only 0.6 gm/1000 ft$^2$ sodium citrate powder dusted on the inner layer, and Sample 16 contained both 0.2 wt. % hydrotalcite and 0.6 gm/1000 ft$^2$ sodium citrate. The samples were conditioned for three days at 120° F. and then assigned an odor rating using the aforedescribed designations, but with an eight person panel.

The results of these tests are summarized in Table E.

TABLE E

| | Tests With Sodium Citrate | |
|---|---|---|
| Sample No. | Type Inner Layer | Odor Rating Average |
| 13 | Control | 2.81 |
| 14 | 0.2% hydrotalcite | 2.19 |
| 15 | 0.6 gm/1000 ft$^2$ sodium citrate | 1.88 |
| 16 | 0.6 gm/1000 ft$^2$ sodium citrate. 0.2% hydrotalcite | 1.50 |

Table E shows there was substantial odor reduction with 0.2% hydrotalcite or 0.6 gm/1000 ft$^2$ sodium citrate only, but the lowest odor rating was achieved with the combination in Sample 16. This is probably because hydrotalcite reduces certain but not all odors, and sodium citrate may reduce different odors. Together they appear to reduce a broader range of odors and the combination is a preferred embodiment of the invention. That is, in addition to the hydrotalcite the polyolefin second layer contains at least about 0.2 gm sodium citrate/1000 ft$^2$. The latter also performs an antiblocking function. Most preferably the sodium citrate content is less than about 2 gm/1000 ft$^2$, as higher concentrations do not provide further improvement in odor reduction and antiblocking. Sodium citrate is most effective when applied as a powder coating on the outside surface of the hydrotalcite-containing polyolefin layer, i.e., the inside surface of a product-containing film package as for example a bag or casing. This is demonstrated by comparing the effectiveness of sodium citrate in Examples 1 and 4.

EXAMPLE 5

In this example, different concentrations of hydrotalcite were used to compare their effectiveness.

Flexible tubes of about 10 inches flat width three layer films comprising Samples 17-19 were prepared using the same laboratory-scale equipment and having the same EVA inner and outer layer compositions as Example 1. The core layer had the same compositive as Example 1 except that the constituents were obtained from the sources identified in Example 2. All films were biaxially oriented and then irradiated at 3MR. The film thicknesses were about 2.2 mils, the inner layer being about 1.3 mils and the outer layer about 0.6 mils. After preparation, the films were conditioned in the aforedescribed manner and then assigned an odor rating using the aforedescribed designations with a five person panel.

Sample 17 contained no hydrotalcite so was the control. Sample 18 contained 0.2 wt. % hydrotalcite in only the inner layer, and Sample 19 contained 0.3 wt. % hydrotalcite in only the inner layer. The result of these tests are summarized in Table F.

TABLE F

| Different Hydrotalcite Loadings | | |
|---|---|---|
| Sample No. | Type Inner Layer | Odor Rating Average |
| 17 | Control | 3.40 |
| 18 | 0.2% hydrotalcite | 1.80 |
| 19 | 0.3% hydrotalcite | 2.20 |

Table F shows that the lowest odor rating was achieved with 0.2 wt. % hydrotalcite, and the rating with 0.3 wt. % hydrotalcite was slightly higher but still represents a substantial improvement over the control. Accordingly, the most preferred loading in the practice of this invention is 0.2 wt. % hydrotalcite.

EXAMPLE 6

The Sample 9 (control-no hydrotalcite) and Sample 12 (0.2% hydrotalcite in inner layer) films were also examined after six weeks storage at 120° F. and 100% relative humidity. This test is expected to present more severe conditions than those expected in at least six months or more storage at normal temperatures in warehouses.

The control Sample 9 had the equivalent of 0.29 mg HCL and 0.32 mg acetic acid/sq ft, a dark color, a strong odor and was 100% blocked, i.e., the tube inner layers adhered together. In contrast Sample 12 had no detectable HCL content and the equivalent of 0.10 mg acetic acid/sq ft, no appreciable change from the initial light color, some odor but considered acceptable, and opened easily.

Although described as being added to a polyolefin layer of a multilayer film having a vinylidene chloride copolymer barrier layer, it should be understood that hydrotalcite in addition to the polyolefin layer may also be added to any and all other layers including core or intermediate layers, and outer layers of the multilayer film and that these other layers may comprise similar or different polyolefins or other polymers.

EXAMPLE 7

A series of experiments were performed to test the effectiveness of "Abscents" a commercially available deodorizing powder marketed by UOP Molecular Sieve Absorbents. This material is a modified crystalline zeolitic aluminosilicate. The films had three layers formed into tubes of about 10 inches flat width. These Samples 20–24 were prepared using the same laboratory-scale equipment and having the same EVA inner and outer layer compositions as Example 1. The core layer had the same composition as Example 1 except that the constituents were obtained form the sources identified in Example 2. All films were biaxially oriented and then irradiated at 3 MR. The film thicknesses were about 2.2 mils, the inner layer being about 1.3 mils and the outer layer about 0.6 mils. After preparation the films were conditioned in the aforedescribed manner and then assigned an odor rating using the aforedescribed designations with a five person panel. Accordingly, with the exception of the additives these films are very similar to the Example 5 films and may be compared therewith for odor reduction.

Sample 20 had no additives so was the control, whereas Samples 21 and 22 respectively had 0.1 wt. % and 0.2 wt. % Abscent in the inner layer only. Samples 23 and 24 respectively had 0.3 wt. % and 0.5 wt. % Abscent in the core layer only. The results of these tests are summarized in Table G.

TABLE G

| Abscents Effectiveness | | |
|---|---|---|
| Sample No. | Abscents Addition | Odor Rating Average |
| 20 | None (control) | 2.80 |
| 21 | 0.1 mg in inner layer | 2.40 |
| 22 | 0.2 mg in inner layer | 2.40 |
| 23 | 0.3 mg in core layer | 2.50 |
| 24 | 0.5 mg in core layer | 2.30 |

Comparison of Table G with Table F shows that Abscents was ineffective as a deodorant compared to the present invention.

Although certain embodiments of this invention have been described in detail, it is contemplated that modifications thereof may be made and some certain features may be employed without others, all within the spirit and scope of the broad invention.

What is claimed is:

1. In a irradiated, deodorized multilayer thermoplastic film having a vinylidene chloride copolymer barrier layer and at least a polyolefin second layer laminated to the barrier layer wherein at least the barrier layer is irradiated, the improvement comprising hydrotalcite blended with said polyolefin in quantity of at least about 0.1 wt. % hydrotalcite.

2. A irradiated, deodorized multilayer film according to claim 1 wherein the barrier layer is a copolymer of vinylidene chloride and vinyl chloride.

3. A irradiated, deodorized multilayer film according to claim 1 wherein the barrier layer is a copolymer of vinylidene chloride and methyl acrylate.

4. A irradiated, deodorized multilayer film according to claim 1 wherein the barrier layer is a blend of vinylidene chloride-vinyl chloride and vinylidene chloride-methyl acrylate copolymers.

5. A irradiated, deodorized multilayer film according to claim 1 wherein the polyolefin layer contains at least about 0.2 gm sodium citrate/1000 ft$^2$.

6. A irradiated, deodorized multilayer film according to claim 1 wherein the polyolefin layer contains about 0.2 wt. % hydrotalcite.

7. A irradiated, deodorized multilayer film according to claim 1 wherein the polyolefin layer is ethylene vinyl acetate.

8. A irradiated, deodorized multilayer film according to claim 1 wherein the polyolefin layer is a blend of ethylene vinyl acetate and linear low density polyethylene.

9. A irradiated, deodorized multilayer film according to claim 1 wherein the polyolefin layer is a blend of ethylene vinyl acetate and very low density polyethylene.

10. A irradiated, deodorized multilayer film according to claim 1 wherein the multilayer film is biaxially oriented and heat shrinkable.

11. A irradiated, deodorized multilayer film according to claim 1 wherein the barrier layer does not contain hydrotalcite.

12. A irradiated, deodorized multilayer film according to claim 1 wherein both the barrier layer and the polyolefin layer are irradiated.

13. A irradiated, deodorized multilayer film according to claim 1 wherein the hydrotalcite is synthetic having the composition expressed by the formula:

$$Mg_{4.5}Al_2(OH)_{13}CO_3 \cdot 3.5H_2O.$$

14. A irradiated, deodorized multilayer film according to claim 1 wherein the polyolefin second layer contains about 0.2 wt. % hydrotalcite.

15. A irradiated, deodorized multilayer film according to claim 1 wherein a polyolefin third layer is laminated to the barrier layer on the opposite side from said polyolefin second layer.

16. A irradiated, deodorized multilayer film according to claim 1 prepared by coextrusion.

17. A deodorized biaxially oriented and heat shrinkable irradiated multilayer film comprising a vinylidene chloride copolymer barrier layer which does not contain hydrotalcite, a polyolefin second layer laminated to said barrier layer on one side thereof comprising ethylene vinyl acetate and hydrotalcite blended therewith in quantity of at least about 0.1 wt. % hydrotalcite, and a polyolefin third layer laminated to said barrier layer on the opposite from said polyolefin second layer, said film being prepared by coextrusion and after biaxial orientation being irradiated.

18. A multilayer film according to claim 17 wherein said polyolefin second layer contains at least about 0.2 gm sodium citrate/1000 ft$^2$ in powder form on the layer outside surface.

* * * * *